United States Patent
Hofmann et al.

[11] Patent Number: 6,154,523
[45] Date of Patent: Nov. 28, 2000

[54] METHOD AND SYSTEM FOR LINKING A TOLL SWITCH

[75] Inventors: Robert J. Hofmann, Piscataway; Douglas W. Jones, Brick, both of N.J.; Karl T. Koppany, Warminster, Pa.; Michael J. Lutz, Flemington, N.J.

[73] Assignee: AT&T Corp, New York, N.Y.

[21] Appl. No.: 09/022,187

[22] Filed: Feb. 11, 1998

[51] Int. Cl.[7] .................................................. H04M 1/24
[52] U.S. Cl. ................................ 379/22; 379/10; 379/15; 379/16; 370/249; 370/251
[58] Field of Search .......................... 379/1, 9, 10, 15, 379/22, 5, 16, 27, 29, 34, 6, 11, 12, 13, 14, 17, 18; 370/244, 245, 247, 248, 249, 250, 251

[56] References Cited

U.S. PATENT DOCUMENTS

| | | | |
|---|---|---|---|
| 4,029,913 | 6/1977 | Gunderson | 379/27 |
| 4,454,388 | 6/1984 | Daniels et al. | 379/27 |
| 4,551,585 | 11/1985 | Daniels et al. | 379/27 |
| 4,661,971 | 4/1987 | Nemchek | 379/29 |
| 5,166,923 | 11/1992 | Ohmori et al. | 379/5 |
| 5,195,124 | 3/1993 | Ishioka | 379/27 |
| 5,347,566 | 9/1994 | Law et al. | 379/27 |
| 5,359,646 | 10/1994 | Johnson et al. | 379/27 |
| 5,422,876 | 6/1995 | Turudic | 379/5 |
| 5,425,075 | 6/1995 | Selden et al. | 379/10 |
| 5,471,517 | 11/1995 | Nakagawa | 379/29 |
| 5,479,473 | 12/1995 | Zey | 379/10 |
| 5,528,661 | 6/1996 | Siu et al. | 379/27 |
| 5,615,225 | 3/1997 | Foster et al. | 379/29 |
| 5,867,558 | 2/1999 | Swanson | 379/34 |

*Primary Examiner*—Curtis A. Kuntz
*Assistant Examiner*—Binh K. Tieu

[57] ABSTRACT

A system and method for connecting a voice band link box to a telephone switch to facilitate trunk-related testing. The system includes a remotable trunk transmission unit being interconnected to the telephone switch and interfacing with the testing device, a voice band link box having an input interface being interconnected to the remotable trunk transmission unit and an output interface being interconnected to a digital trunk of the telephone switch, and an output device being interconnected to the telephone switch. The testing device interfaces with the remotable trunk transmission unit and places a call by transmitting an analog signal via the remotable trunk transmission unit directed to the output device. The voice band link box receives the analog signal at its input interface, converts the analog signal to a digital signal and routes the digital signal from the output interface over the digital trunk of the telephone switch. The call is received at the output device.

5 Claims, 5 Drawing Sheets

METHOD AND SYSTEM FOR LINKING A TOLL SWITCH

BACKGROUND OF THE INVENTION

1. Field of the Invention

The present invention relates generally to telecommunications, and more particularly to a method and system for connecting a voice band link box to a toll switch to facilitate trunk-related testing.

2. Description of the Related Art

Presently, trunk-related testing of a typical long distance telephone switch (such as a 4ESS switch toll switching system formerly available from AT&T) in a telecommunications network is performed by a technician utilizing a remotable trunk transmission unit (such as the Remote Measurement System Digital 2, or RMS-D2, unit available from AT&T). The RMS-D2 is a testing device that is wired to and forms a part of the 4ESS switch having the trunk circuit to be tested. The RMS-D2 provides the technician with the capability to monitor the communications path of the trunk under test. The testing technician is typically located at a network operating center ("NOC") designated specifically for the purpose of testing or at a remote location wherein the technician communicates with the RMS-D2 by means of a modem.

An example of a prior art testing system 10 in which a technician utilizing a tester 28 performs a trunk-related test is illustrated in FIG. 2. Testing system 10 generally includes 4ESS switch toll switches 12 and 26, tester 28, an originating access switch having a software controller TOPAS 30, and either a private branch exchange ("PBX") 32, end office ("EO") 34 or D-4 Multiplexer ("D-4 Mux") 36.

The 4ESS switch 12 has three RMS-D2 cabinets 20, 22 and 24, with each cabinet having a group of ten voice band links ("VBL"s) 44, 46 and 48, respectively. A VBL is a two-wire analog connection serving as a communications link from the RMS-D2 to the local PBX 32, EO 34 or D-4 Mux 36. Each VBL provides talk/listen and speaker communications paths to the technician. At tester 28, the talk/listen is provided via a PBX-compatible multibutton station set (not shown) allowing a full talk path and the speaker is provided via a PBX-compatible monitor speaker (not shown) allowing a monitor function only. The talk/listen and speaker capabilities allow the technician to properly evaluate and sectionalize troubles which could not otherwise be found by standard transmission testing. The PBX 32, EO 34 or D-4 Mux 36 interface by means of a two-wire analog line 38, 40 or 42, respectively, to a trunk sub-group ("TSG") 18, 16 or 14, respectively, of the 4ESS switch 12 to be tested. The TSG's 14, 16 and 18 link to the station set and monitor speaker at tester 28 through 4ESS switch 26 via a talk/listen two-wire analog line 52 and a speaker two-wire analog line 54, respectively.

To test TSG 18, 16 or 14 of 4ESS switch 12, the technician utilizing the tester 28 interfaces with the RMS-D2 via software controller TOPAS 30 over a data wide area network ("DWAN") 50. The technician instructs the RMS-D2 to access TSG 14, 16 or 18 via software controller TOPAS 30 and determine whether TSG 14, 16 or 18 is idle or in service. The technician then instructs the RMS-D2 via software controller TOPAS 30 to place an incoming call to either the technician's station set (for talk/listen if TSG 14, 16 or 18 is idle) or monitor speaker (for speaker if TSG 14, 16 or 18 is in service). Dialing instructions from software controller TOPAS 30 are sent to the RMS-D2, causing the RMS-D2 to dial out over the switched network by seizing and sending a signal via a VBL from one of the three RMS-D2 cabinets 20, 22 or 24 to PBX 32, EO 34 or D-4 Mux 36. The PBX 32, EO 34 or D-4 Mux 36 transmits the signal to TSG 18, 16 or 14, respectively, of 4ESS switch 12. The signal is then transmitted along either talk/listen two-wire analog line 52 or speaker two-wire analog line 54, depending on the technician's selection above, through another originating access switch, 4ESS switch 26, and back to tester 28. If the monitor function was selected, the technician will be able to listen to the accessed line over the monitor speaker device. If the talk/listen function was selected, the station set will ring.

Essentially, testing system 10 emulates a four-wire telephone line. However, a shortcoming of testing system 10 is that the thirty two-wire analog telephone lines from the three RMS-D2 cabinets 20, 22 and 24 for voice access for testing and data connections must be purchased from the local telephone company or obtained via an internal telephone service because the lines must be connected to 4ESS switch 12 through PBX 32 or the like. The purchase of these lines is extremely costly to the long distance carrier, and the cost is amplified by the number of 4ESS switches in the long distance network.

Referring now to FIG. 4, a prior art testing system 100 is shown in which a technician communicates with the RMS-D2 from a remote location by means of a modem. Testing system 100 generally includes a 4ESS switch 104, a telephone switching system such as AT&T Switching Network ("ASN") 102, a tester 118 and a PBX 114 or an EO (not shown).

The 4ESS switch 104 has three RMS-D2 cabinets 106, 108 and 110, with each cabinet having a single VBL 128, 130 and 132, respectively, providing a communications link to PBX 114 or the EO. The PBX 114 or the EO interfaces to tester 118 through ASN 102 by means of two-wire analog line 120. The technician is positioned at tester 118 with a computer device having a modem and Switched Message Automatic Remote Testing Software ("SMARTS") installed. SMARTS is a DOS-based PC system that allows the technician to remotely access the RMS-D2 in 4ESS switch 104 on a secured dial-up connection for the purpose of testing, although the testing is limited to transmission testing for sectionalization/specialized trouble shooting.

To perform a test, the technician located at tester 118 transmits a control command to the RMS-D2 instructing the RMS-D2 to locate, access and test a specific trunk circuit (not shown) of 4ESS switch 104. The control command is transmitted along two-wire analog line 120 to ASN 102. From ASN 102, the control command is transmitted through PBX 114 and into one of the three cabinets 106, 108 or 110 of the RMS-D2 via VBL 128, 130 or 132, respectively. When the RMS-D2 receives the control command from tester 118, the RMS-D2 "handshakes" with tester 118, i.e., acknowledges receipt of the control command and that a communication link has been established, locates and accesses the specified trunk circuit, performs the requested test on the trunk circuit and finally reports the test result back to tester 118 over the communication link.

A shortcoming of testing system 100 involves the cost associated with purchasing three two-wire analog telephone lines 128, 130 and 132 (multiplied by the number of 4ESS switches in the network) from the local telephone companies.

Finally, referring now to FIG. 6, a prior art testing system 200 which does not utilize an RMS-D2 and wherein a customer service representative located at a NOC 210 performs a verification on a 4ESS switch 202 in response to a customer's complaint that the customer is not receiving calls from a particular geographical area is illustrated. Testing system 200 generally includes 4ESS switch 202, an ASN 208, a customer site 204, a PBX 216 and NOC 210. The NOC 210 links to 4ESS switch 202 through PBX 216 via an access trunk order circuit ("ATOC") implemented particularly for this type of testing. There is one ATOC per 4ESS switch in the network (e.g., there are 135 ATOC's in the AT&T network). The ATOC 212 provides direct access to 4ESS switch 202 for call processing verification through 4ESS switch 202. The 4ESS switch 202 links to ASN 208 via a two-wire analog line 206, and to the customer site 204 from ASN 208 over a two-wire analog line 214.

As an example, the customer, who is located in New York, calls the customer service representative, who is located in Denver, and tells the customer service representative that the customer is not receiving calls from Tulsa. The customer service representative at the Denver NOC 210 makes a call over ATOC 212 through the 4ESS switch serving Tulsa, i.e., 4ESS switch 202, to a 4ESS switch (not shown) serving the New York area and over line 206 into the New York ASN 208, and finally over line 214 to New York customer site 204. The customer service representative at the Denver NOC 210, while connected to the customer, tells the customer that the customer service representative is calling the customer through Tulsa, and thus the customer should be able to receive calls from Tulsa, i.e., there is no problem with 4ESS switch 202. If, on the other hand, the customer service representative is unable to connect to the customer site 204 through 4ESS switch 202, the customer service representative will be alerted that 4ESS switch 202 is faulty.

A shortcoming of testing system 200 is the cost of purchasing and maintaining an ATOC per 4ESS switch in the telecommunications network to perform the above verification process.

3. Summary of the Invention

In accordance with the present invention, a system and method for connecting a VBL box to a telephone switch to facilitate trunk-related testing is provided. The system includes a remotable trunk transmission unit being interconnected to the telephone switch and interfacing with the testing device, a voice band link box having an input interface being interconnected to the remotable trunk transmission unit and an output interface being interconnected to a digital trunk of the telephone switch, and an output device being interconnected to the telephone switch. The testing device interfaces with the remotable trunk transmission unit and places a call by transmitting an analog signal via the remotable trunk transmission unit directed to the output device. The voice band link box receives the analog signal at its input interface, converts the analog signal to a digital signal and routes the digital signal from the output interface over the digital trunk of the telephone switch. The call is received at the output device.

The foregoing specific objects and advantages of the invention are illustrative of those that can be achieved by the present invention and are not intended to be exhaustive or limiting of the possible advantages which can be realized. Thus, these and other objects and advantages of this invention will be apparent from the description herein or can be learned from practicing this invention, both as embodied herein or as modified in view of any variations which may be apparent to those skilled in the art. For example, although the present invention is described with respect to long distance toll switches, it is understood that the present invention is equally applicable to local switches such as the 5ESS switch formerly manufactured and supplied by AT&T. Accordingly, the present invention resides in the novel parts, constructions, arrangements, combinations and improvements herein shown and described.

BRIEF DESCRIPTION OF THE DRAWINGS

The foregoing features and other aspects of the invention are explained in the following description taken in connection with the accompanying drawings, wherein.

DETAILED DESCRIPTION

Figure 1:
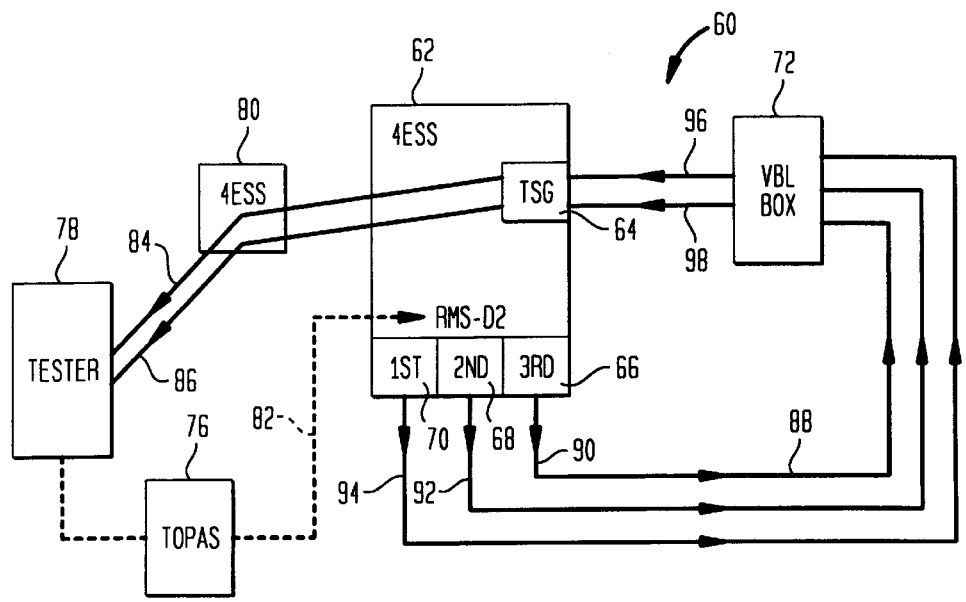
FIG. 1 is a perspective view of one embodiment of a system according to the present invention wherein a direct connection is provided between an RMS-D2 of a 4ESS switch and a TSG of the 4ESS switch by means of a VBL box.

Referring to FIG. 1, a testing system 60 according to an embodiment of the present invention wherein a direct connection is provided between an RMS-D2 of a 4ESS switch 62 and a TSG 64 of 4ESS switch 62 by means of a VBL box 72 is shown. The system 60 generally includes 4ESS switch 62, a 4ESS switch 80, a tester 78 at a network operating center, an originating access switch having a software controller TOPAS 76, and VBL box 72.

As with prior art testing system 10 described above with respect to FIG. 2, 4ESS switch 62 has three RMS-D2 cabinets 66, 68 and 70, with each cabinet having a group of ten VBL's 90, 92 and 94, respectively. The VBL's are restricted to originating a voice call, and do not require ringing, audible ringback or ring tip detection. However, whereas each VBL of prior art testing system 10 serves as a communication link from the RMS-D2 to a local PBX or the like, each VBL in testing system 60 inputs to VBL box 72 via a loop start interface 320, discussed below with respect to FIG. 8. The VBL box 72 outputs to TSG 64 of 4ESS switch 62 via a DS1 interface 74 and communicates over trunks 96 and 98 via a DS1 (T1.5) stream produced therein by a Primary Access Control ("PAC") device 318 in communication with interface 74. Each DS1 stream is comprised of 24 DS0 channels. Each VBL is specifically assigned to one of the two streams. At tester 78, the talk/listen is provided via a PBX-compatible multibutton station set (not shown) allowing a full talk path and the speaker is provided via a PBX-compatible monitor speaker (not shown) allowing a monitor function only. The talk/listen and speaker capabilities allow the technician to properly evaluate and sectionalize troubles which could not otherwise be found by standard transmission testing. The TSG 64 links to the station set and monitor speaker at tester 78 through 4ESS switch 80 via a talk/listen two-wire analog line 84 and a speaker two-wire analog line 86, respectively.

Figure 8:
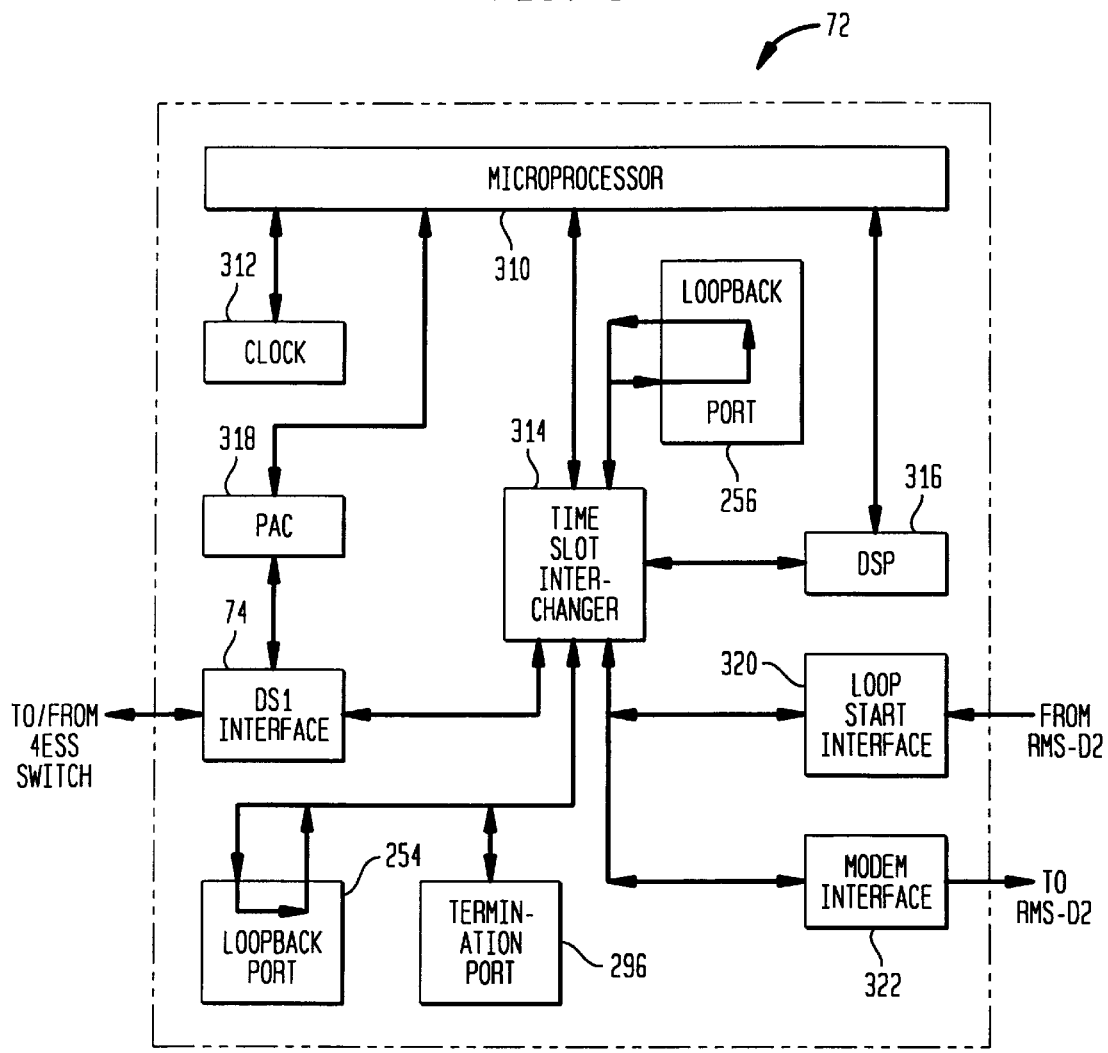
FIG. 8 is a schematic view of the VBL box of the present invention.

As illustrated in FIG. 8, the VBL box 72 is controlled by a microprocessor 310 that performs many functions, including device initialization, call process manipulation and fault monitoring/detection. Microprocessor 310 has access to all major components in the unit, and is shown to be in direct communication with a clock 312, PAC device 318, a Time Slot Interchanger ("TSI") 314 and a Digital Signal Processor ("DSP") 316. Call flow through VBL box 72 is accomplished from the loop start interface 320 or a modem interface 322 via Time Slot Interchanger 314 under the control of microprocessor 310. TSI 314 is in direct communication with DSP 316, loopback ports 254 and 256, termination port 296, DS1 interface 74, modem interface 322 and loop start interface 320. The function of DSP 316 is to provide tone generation for call processing and wink-start signal detection discussed in more detail below. Tones generated in DSP 316 are transmitted to TSI 314 and cross-connected to an appropriate channel, as required. Analog VBL input into VBL box 72 is converted by loop start interface 320 to digital 8-bit μLAW encoded pulse code modulated ("PCM") and assigned to a corresponding DS0 channel in the designated DS1 stream by TSI 314. Digital PCM voice data input to VBL box 72 from a 4ESS switch is converted by DS1 interface 74 from digital to analog. Clock 312 measures the time of a VBL connection and automatically terminates the VBL connection after a specified period of time, e.g., an hour, to protect a testing technician from the high cost associated with a maintained connection, discussed below. Loopback ports 254 and 256, termination port 296 and modem interface 322 will be discussed in more detail below with respect to alternate embodiments of the present invention.

To perform a test of TSG 64 of 4ESS switch 62, the technician located at tester 78 interfaces with the RMS-D2 via software controller TOPAS 76 over a DWAN 82. The technician instructs the RMS-D2 via software controller TOPAS 76 to access TSG 64 and determine whether TSG 64 is idle or in service. The technician then instructs the RMS-D2 via software controller TOPAS 30 to place an incoming call to either the technician's station set (for talk/listen if TSG 64 is idle) or monitor speaker (for speaker if TSG 64 is in service). Dialing instructions from software controller TOPAS 76 are sent to the RMS-D2, causing the RMS-D2 to dial out over the switched network by seizing a VBL and sending an analog signal via the seized VBL from one of the three RMS-D2 cabinets 66, 68 or 70 to loop start interface 320 of VBL box 72. The loop start interface 320 inverts the signal, converts the analog signal to a digital signal, and TSI 314 transmits the signal via DS1 interface 74 over its assigned DS0 of DS1 stream to TSG 64 of 4ESS switch 62. Inverting the signals eliminates the problem of a long distance carrier paying for a maintained connection. Instead, tester 78 pays the cost of the connection as the call originator. The signal is then transmitted from TSG 64 along either talk/listen two-wire analog line 84 or speaker two-wire analog line 86, depending on the technician's selection above, through another originating access switch, 4ESS switch 80, and finally back to tester 78. If the monitor function was selected, the technician can listen to the accessed line over the monitor speaker device. If the talk/listen function was selected, the station set will ring.

Figure 2:
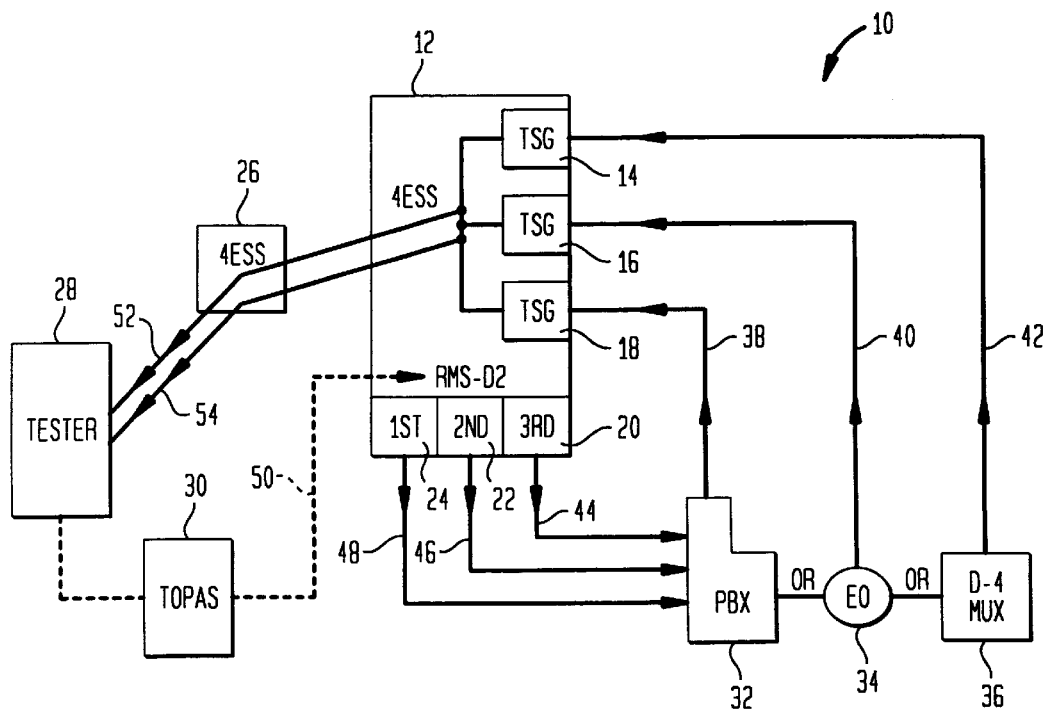
FIG. 2 is a perspective view of a prior art system to the system of FIG. 1.

Testing system 60 eliminates the costs of testing system 10 of FIG. 2 by connecting VBL box 72 directly to 4ESS switch 62 and avoiding the need to connect the VBL groups 90, 92 and 94 to 4ESS switch 62 through a PBX or the like. In other words, testing system 60 does not require the purchase of thirty two-wire analog lines per 4ESS switch in the network from local telephone companies.

Figure 3:
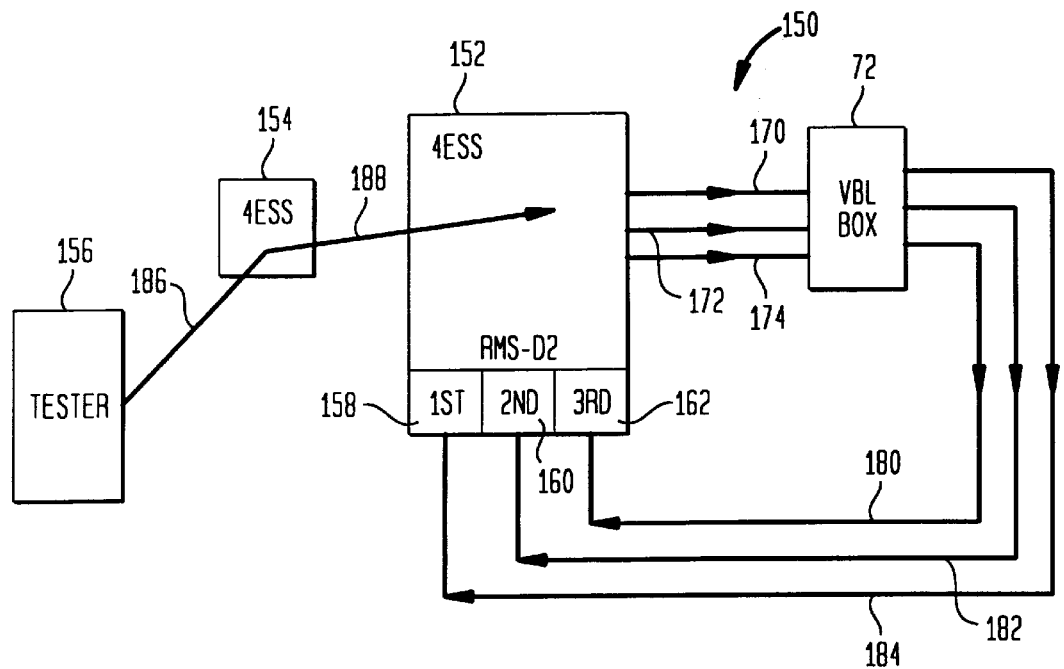
FIG. 3 is a perspective view of another embodiment of a system according to the present invention wherein a direct connection is provided between an RMS-D2 of a 4ESS switch and the 4ESS switch by means of the VBL box.

Referring now to FIG. 3, a testing system 150 is shown according to another embodiment of the present invention wherein a technician communicates with the RMS-D2 at a remote location by means of a modem. Testing system 150 generally includes a tester 156 comprising a computer device having a modem and SMARTS software installed therein, 4ESS switches 152 and 154, and VBL box 72.

The 4ESS switch 152 has three RMS-D2 cabinets 158, 160 and 162, with each cabinet having a single VBL 184, 182 and 180, respectively, providing a communications link to modem interface 322 of VBL box 72. The 4ESS switch 152 communicates with DS1 interface 74 of VBL box 72 via a DS0 channel within trunks 170, 172 and 174. The DS0 channels within trunks 170, 172 and 174 have a loop-start signalling protocol and can only terminate calls. The DS0 channels are also arranged with a 20 Hz superimposed ringing and an audible ringback tone. The technician is positioned at tester 156 that interfaces with 4ESS switch 154 over two-wire analog line 186, which interfaces with 4ESS switch 152 along two-wire analog line 188.

To perform a test of 4ESS switch 152, the technician located remotely at tester 156 transmits a control command to the RMS-D2 instructing the RMS-D2 to locate, access and test a trunk circuit (not shown) of 4ESS switch 152. The control command is transmitted along two-wire analog line 186 and switched via 4ESS switch 154 over two-wire analog line 188 to 4ESS switch 152. From 4ESS switch 152 the control command is transmitted over a DS0 channel of trunk 170, 172 or 174 of a TSG (not shown) to DS1 interface 74 of VBL box 72. The control command is converted by DS1 interface 74 from digital to analog and is transmitted from TSI 314 via modem interface 322 across VBL 180, 182, or 184 to one of the three cabinets 162, 160 or 158 of the RMS-D2, respectively. As with prior art system 100 of FIG. 4, after the RMS-D2 receives the control command from tester 156, the RMS-D2 handshakes with tester 156, locates and accesses the trunk circuit, performs the requested test and finally reports the test result back to tester 156. During testing, seizures or incoming calls from 4ESS switch 152 are monitored by VBL box 72, and when detected VBL box 72 activates the 20 Hz superimposed ringing to signal the modem and provides audible ringback toward 4ESS switch 152 to signal the calling party. No addressing is detected by VBL box 72. Once the modem answers, VBL box 72 detects the answering, changes the state of the call to "answer," and remains transparent to the call until on-hook signals are received.

Figure 4:
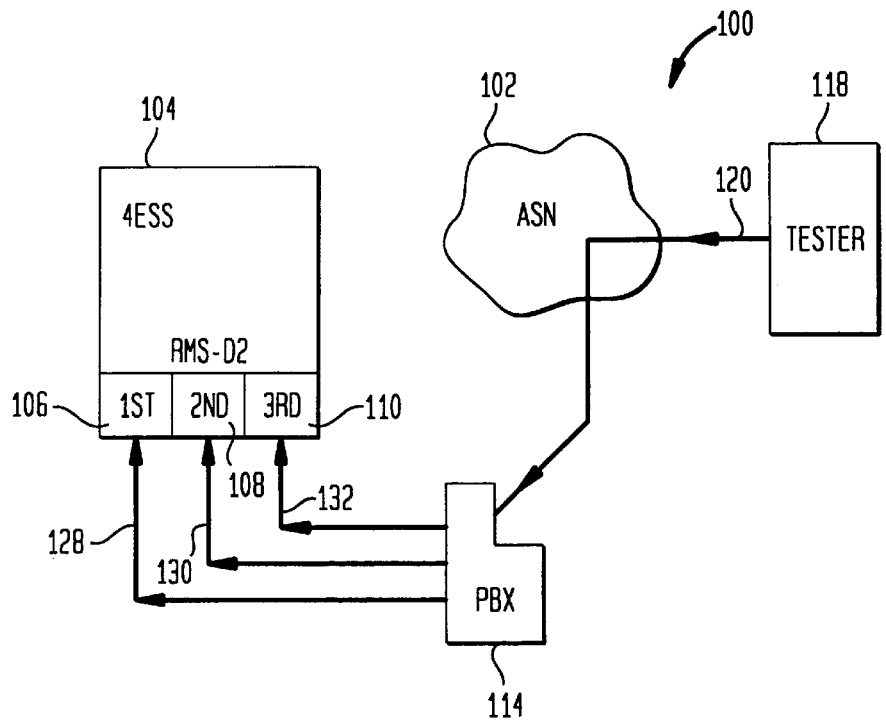
FIG. 4 is a perspective view of a prior art system to the system of FIG. 3.

Testing system 150 eliminates the costs of testing system 100 of FIG. 4 associated with purchasing three two-wire analog telephone lines per 4ESS switch in the network from local telephone companies.

Figure 5:
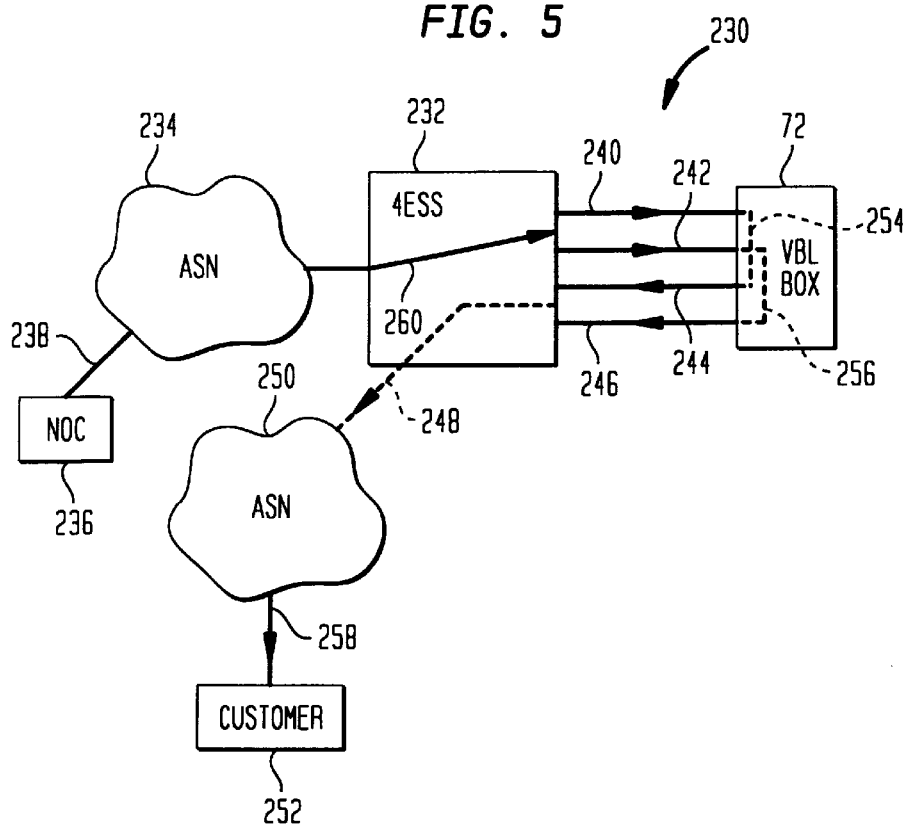
FIG. 5 is a perspective view of another embodiment of a system according to the present invention wherein two loopback ports are provided in the VBL box to provide automatic loopbacks from an incoming DS0 channel to a corresponding outgoing DS0 channel.

Referring now to FIG. 5, a testing system 230 according to another embodiment of the present invention is shown wherein a customer complains that the customer is not receiving calls from a particular geographical region. The system 230 generally includes a NOC 236, an ASN 234, a 4ESS switch 232, VBL box 72, an ASN 250 and a customer site 252.

The NOC 236 interfaces over a two-wire analog line 238 to a software defined network (not shown) of ASN 234, which interfaces over a two-wire analog line 260 to 4ESS switch 232. The VBL box 72 provides two loopback ports 254 and 256, each being assigned an incoming DS0 on trunks 240 and 242, respectively, originating from 4ESS switch 232, and an outgoing DS0 on trunks 244 and 246, respectively, terminating at 4ESS switch 232. Trunks 240, 242, 244 and 246 are all linked to VBL box 72 via DS1 interface 74. The customer site 252 interfaces over two-wire analog line 258 to ASN 250, which interfaces over a two-wire analog line 248 to 4ESS switch 232.

The verification process with respect to testing system 230 for a customer service representative in Denver receiving a complaint from a customer in New York that the customer is not receiving calls from Tulsa is as follows. First, the customer service representative at the Denver NOC 236 dials the one of, e.g., 135 codes, corresponding to 4ESS switch 232 servicing the Tulsa area over two-wire analog line 238 to the software defined network of ASN 234. Software at ASN 234 switches the call to 4ESS switch 232 over two-wire analog line 260, which in turn seizes one of the incoming DS0's of trunk 240 or 242. The loopback ports 254 and 256 provide answer supervision to seizure of incoming DS0 channel of trunk 240 or 242 by tester 236 through 4ESS switch 232. After seizure of incoming DS0 channel of trunk 240 or 242 is detected, loopback port 254 or 256 seizes the assigned outgoing DS0 channel of trunk 244 or 246, respectively, and connects the assigned incoming and outgoing DS0 channels. In response to the seizure, outgoing DS0 channel of trunk 244 or 246 provides a wink-start signal to the corresponding loopback port 254 or 256. Wink detection for loopback ports 254 and 256 is performed in the DSP 316 of VBL box 72. The wink-start signal detection window is 150 ms to 600 ms. A wink-start signal having a duration within this window is accepted by VBL box 72 as a valid signal. After receiving a wink-start signal, VBL box 238 transmits the wink-start signal and a confirmation BONG tone via DS1 interface 74 to the calling party at NOC 236. Both the wink-start signal and BONG tone are derived in the DSP 316 and the tone is sent to the TSI for cross-connection to the corresponding incoming DS0 channel of trunk 240 or 242. Once loopback port 254 or 256 has played the BONG tone acknowledgement, the incoming caller at NOC 236 enters the desired destination phone number of New York customer site 252 via dual tone multi frequency ("DTMF") tones, as required by trunk provisioning in 4ESS switch 232. The tones enter DS1 interface 74 of VBL box 72 via incoming DS0 channel of trunk 240 or 242, pass through loopback port 254 or 256, and back into 4ESS switch 232 on outgoing DS0 channel of trunk 244 or 246, respectively, are detected by 4ESS switch 232 and sent along two-wire analog line 248 to ASN 250 where they are then transmitted over two-wire analog line 258 to New York customer site 252.

Any network announcement is heard by the caller. If outgoing DS0 channel of trunk 244 or 246 returns an ON-HOOK signal, incoming DS0 channel of trunk 240 or 242 is also issued an ON-HOOK, thereby terminating the call. If incoming DS0 channel of trunk 240 or 242 returns an ON-HOOK signal, outgoing DS0 channel of trunk 244 or 246 is also issued an ON-HOOK, thereby terminating the call. If outgoing DS0 channel of trunk 240 or 242 does not respond correctly to call handling supervision (i.e., does not return an ON-HOOK), the incoming call for the respective outgoing DS0 channel of trunk 244 or 246 will be answered by the customer at New York customer site 252.

If an OFF-HOOK condition from 4ESS switch 232 is detected on either the incoming or outgoing DS0's, the microprocessor 310 signals the DSP 316 to begin a call processing algorithm. The microprocessor 310 configures the TSI 314 to copy the incoming DS0 data and signal bytes to the assigned outgoing DS0 to 4ESS switch 232. The 4ESS switch 232 then sends a wink-start signal back to VBL box 72. The loopback connection in the TSI 314 loops the wink-start signal from outgoing DS0 channel of trunk 244 or 246 to incoming DS0 240 or 242, and sends the BONG tone to incoming DS0 channel of trunk 240 or 242 as an indication that the connection is established. The VBL box 72 remains transparent to the voice and signaling data. When either side hangs up, the other side is also placed ON-HOOK. If the outgoing DS0 channel of trunk 244 or 246 of the loopback connection fails to release, a BUSY tone is sent to the calling party on subsequent seizures. This condition exists until the loopback connection is released.

Figure 6:
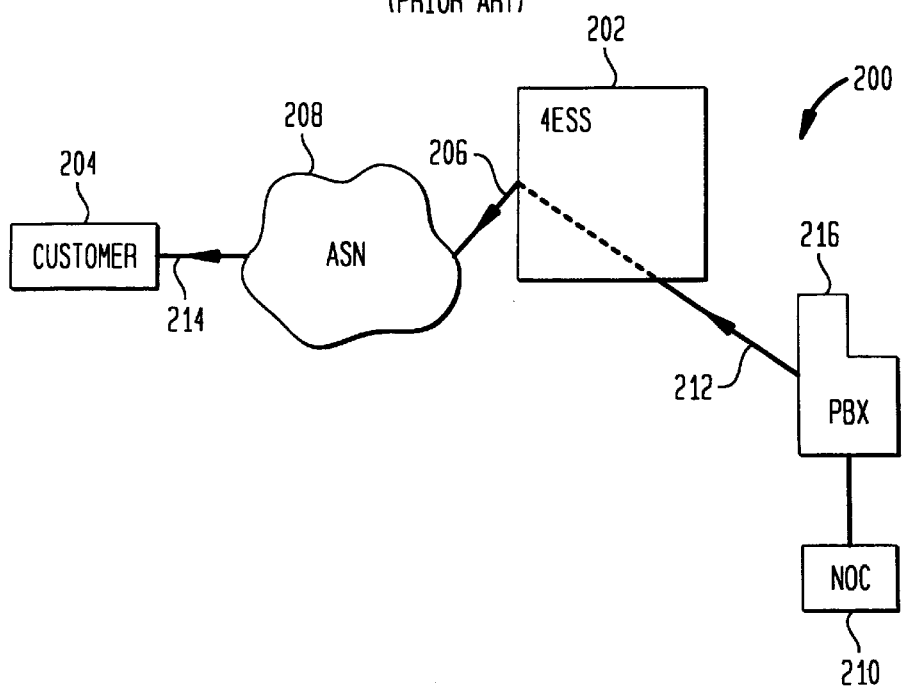
FIG. 6 is a perspective view of a prior art system to the system of FIG. 5.

Testing system 230 overcomes the shortcomings of testing system 200 of FIG. 6 by eliminating the annual costs and operating expenses associated with purchasing multiple ATOC's in the long distance telephone network.

Figure 7:
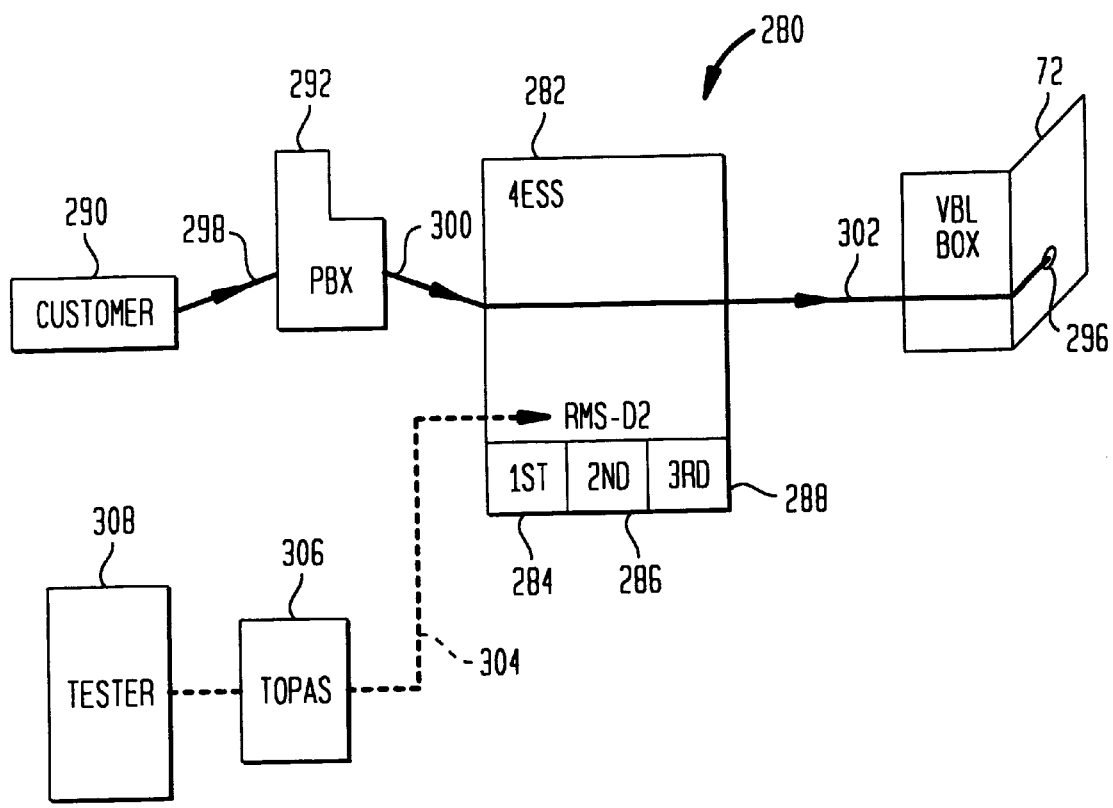
FIG. 7 is a perspective view of another embodiment of a system according to the present invention wherein a test termination of the VBL box provides answer supervision and a tone to an incoming call.

Referring now to FIG. 7, a testing system 280 of the present invention wherein VBL box 72 includes a digital termination port 296 that provides answer supervision and a tone to an incoming call is illustrated. Testing system 280 is utilized when a customer at a customer site 290 complains of hearing noise on the customer's telephone line, and a technician located at a NOC with tester 308 traces an incoming call from the customer to determine the trunk name and line number of two-wire analog line 300 servicing the incoming call.

Testing system 280 generally comprises a 4ESS switch 282 comprising three RMS-D2 cabinets 284, 286 and 288, VBL box 72, a PBX 292 or LEC (not shown), tester 308, an originating access switch having a software controller TOPAS 306 and customer site 290.

The digital terminating port 296 of VBL box 72 interfaces with 4ESS switch 282 via a DS0 channel of trunk 302 terminating at DS1 interface 74. The customer site 290 interfaces with 4ESS switch 282 via a two-wire analog line 298 that connects through PBX 292 to the two-wire analog line 300 of the routing trunk circuit of 4ESS switch 282.

To perform a test on 4ESS switch 282, the technician located at the NOC with tester 308 interfaces with the RMS-D2 via the software controller TOPAS 306 over a DWAN 304. The technician then instructs the customer to dial a telephone number associated with VBL box 72 and to stay on the line for a specified amount of time after a tone begins to sound. The customer's call is transmitted over two-wire analog line 298, through the PBX 292 and over two-wire analog line 300 of the trunk circuit of 4ESS switch 282, wherein the incoming call is connected through DS1 interface 74 to the digital termination port 296 of VBL box 72 via DS0 channel of trunk 302. The termination port 296 of VBL box 72 transmits an 8-bit $\mu$LAW encoded PCM 1004 Hz tone at a level of −10.0 dBm back to customer site 290. The technician then instructs the RMS-D2 via software controller TOPAS 306 to seize DS0 channel of trunk 302 and trace the DS0 to determine the name of trunk 302 and line number over which the incoming call is being routed. The RMS-D2 seizes DS0 channel of trunk 302 and answer supervision is returned from 4ESS switch 282. If an OFF-HOOK condition is detected from 4ESS switch 282, microprocessor 310 returns answer supervision through TSI 314 and cross connects the channel with the 1004 Hz tone to its respective channel. If an ON-HOOK condition from 4ESS switch 282 is detected, microprocessor 310 removes the tone signal cross connection and reestablishes the idle code connection toward 4ESS switch 282. The RMS-D2 then traces DS0 channel of trunk 302 to two-wire analog line 300 and transmits a report to the technician over DWAN 304 via software controller TOPAS 306 that the call is specifically coming from two-wire analog line 300 and its corresponding trunk circuit. The trunk circuit remains nailed up until a disconnect signal is received from 4ESS switch 282, at which time the tone terminates.

Although the present invention is described with respect to long distance toll switches, it is understood that the present invention is equally applicable to local switches, such as the 5ESS formerly manufactured and supplied by AT&T.

Although illustrative preferred embodiments have been described herein in detail, it should be noted and will be appreciated by those skilled in the art that numerous variations may be made within the scope of this invention without departing from the principle of this invention and without sacrificing its chief advantages. The terms and expressions have been used herein as terms of description and not terms of limitation. There is no intention to use the terms or expressions to exclude any equivalents of features shown and described or portions thereof and this invention should be defined in accordance with the claims which follow.

We claim:

1. A method for performing a test on a telephone switch by a testing device, comprising:

transmitting a predetermined code corresponding to the telephone switch from the testing device to a switching network, wherein the switching network interfaces the testing device to a first digital trunk of the telephone switch;

seizing an incoming channel of the first digital trunk at a voice band link box;

seizing an outgoing channel of a second digital trunk of the telephone switch at the voice band link box;

placing a call from the testing device directed to a customer site;

routing the call from the telephone switch to the voice band link box over the seized incoming channel and back to the telephone switch from the voice band link box over the seized outgoing channel; and routing the call from the telephone switch to the customer site, wherein seizing the outgoing channel further comprises:

the outgoing channel providing a wink-start signal to a loopback port of the voice band link box; and the loopback port transmitting the wink-start signal to the testing device, and wherein placing the call further comprises:

the loopback port of the voice band link box receiving an off-hook signal;

copying data from the incoming channel to the outgoing channel;

transmitting the data to the telephone switch;

receiving a wink-start signal from the telephone switch; and sending a confirmation tone to the incoming channel.

2. A system for performing a test on a telephone switch by a testing device, comprising:

a switching network in communication with a first digital trunk of the telephone switch;

a voice band link box having an input interface and an output interface, the input interface being interconnected to the first digital trunk of the telephone switch, and the output interface being interconnected to a second digital trunk of the telephone switch, the input interface being interconnected to the output interface by a loopback port; and a customer site in communication with the second digital trunk of the telephone switch;

wherein the testing device is configured to transmit a predetermined code corresponding to the telephone switch to the switching network and to place a call directed to the customer site;

wherein the switching network is configured to interface the testing device to the first digital trunk of the telephone switch;

wherein the loopback port of the voice band link box is configured to seize an incoming channel of the first digital trunk, seize an outgoing channel of the second digital trunk and route the call from the telephone switch over the seized incoming channel and back to the telephone switch over the seized outgoing channel; and wherein the telephone switch is configured to route the call from the seized outgoing channel to the customer site.

3. The system of claim 2, wherein the outgoing channel is configured to provide a wink-start signal to the loopback port of the voice band link box and the loopback port is configured to transmit the wink-start signal to the testing device.

4. The system of claim 2, wherein the incoming channel or the outgoing channel is configured to transmit an on-hook signal to the telephone switch and the telephone switch is configured to terminate the call upon receipt of the on-hook signal.

5. The system of claim 2, wherein the loopback port of the voice band link box is further configured to receive an off-hook signal, copy data from the incoming channel to the outgoing channel, transmit the data to the telephone switch, receive a wink-start signal from the telephone switch and send a confirmation tone to the incoming channel.

* * * * *